United States Patent
Qi et al.

(10) Patent No.: US 9,930,005 B2
(45) Date of Patent: Mar. 27, 2018

(54) METHOD, DEVICE AND SYSTEM FOR PROCESSING DNS CACHE INFORMATION

(71) Applicant: BEIJING QIHOO TECHNOLOGY COMPANY LIMITED, Beijing (CN)

(72) Inventors: Xiangdong Qi, Beijing (CN); Can Pu, Beijing (CN); Xiaosheng Tan, Beijing (CN)

(73) Assignee: Beijing Qihoo Technology Limited, Beijing (CN)

( * ) Notice: Subject to any disclaimer, the term of this patent is extended or adjusted under 35 U.S.C. 154(b) by 0 days.

(21) Appl. No.: 15/301,712

(22) PCT Filed: Mar. 19, 2015

(86) PCT No.: PCT/CN2015/074607
§ 371 (c)(1),
(2) Date: Oct. 3, 2016

(87) PCT Pub. No.: WO2015/149628
PCT Pub. Date: Oct. 8, 2015

(65) Prior Publication Data
US 2017/0126617 A1    May 4, 2017

(30) Foreign Application Priority Data
Apr. 4, 2014   (CN) .......................... 2014 1 0135732

(51) Int. Cl.
*G06F 15/16* (2006.01)
*H04L 29/12* (2006.01)
(Continued)

(52) U.S. Cl.
CPC .... *H04L 61/1511* (2013.01); *G06F 17/30362* (2013.01); *G06F 17/30477* (2013.01);
(Continued)

(58) Field of Classification Search
USPC ......................................................... 709/245
See application file for complete search history.

(56) References Cited

U.S. PATENT DOCUMENTS
2010/0174829 A1   7/2010   Drako

FOREIGN PATENT DOCUMENTS
CN   102325010 A   1/2012
CN   103957239 A   7/2014

OTHER PUBLICATIONS
International Patent Application No. PCT/CN2015/074607; Int'l Search Report and the Written Opinion; dated Jul. 5, 2015; 4 pages.

*Primary Examiner* — Hee Soo Kim
(74) *Attorney, Agent, or Firm* — Baker & Hostetler LLP

(57) ABSTRACT

Provided are a DNS cache information processing method, device and system. The method comprises: upon reception of a client request, resolving and obtaining domain name information requested by the client; querying in a database a data structure corresponding to the domain name information; when finding the data structure, acquiring read lock information corresponding to the data structure, the read lock information being permission information allowing performing a read operation of the cache information stored in the data structure; reading the cache information in the data structure by using the permission of the read lock information, and transmitting the read cache information to a sender requested by the client. The embodiment of the present invention can improve caching speed and cache information throughput, improving the flexibility of cache information, and enhancing the quality of stored information.

20 Claims, 4 Drawing Sheets

(51) Int. Cl.
   *H04L 29/08* (2006.01)
   *H04L 29/06* (2006.01)
   *G06F 17/30* (2006.01)
(52) U.S. Cl.
   CPC ...... *H04L 61/6009* (2013.01); *H04L 67/2842* (2013.01); *H04L 67/42* (2013.01)

METHOD, DEVICE AND SYSTEM FOR PROCESSING DNS CACHE INFORMATION

CROSS-REFERENCE TO RELATED APPLICATIONS

This application is the national stage of International Application No. PCT/CN2015/074607 filed Mar. 19, 2015, which is based upon and claims priority to Chinese Patent Applications No. CN201410135732.1, filed Apr. 4, 2014, the entire contents of which are incorporated herein by reference.

FIELD OF TECHNOLOGY

The disclosure relates to the field of Internet applications, and in particular, to a method, device and system for processing DNS cache information.

BACKGROUND

In people's daily life, when a network is used for querying data or information, generally a result cached by using a domain name system (DNS) technology is received. However, a DNS cached result is time-sensitive, namely a response result is unchanged within valid time. Therefore, the DNS cached result may be stored in a cache memory of a server device so that the DNS cached result may be returned to a result of a client request within extremely short time. After the valid time expires, a system may query the domain name from an external network and update a result into the cache memory.

In the prior art, generally by using a read-write lock, visitors of shared resources are divided into readers and writers. The readers merely carry out read access on the shared resources, whereas the writers need to carry out a write operation on the shared resources. In the prior art, when writing cache, a read cache thread cannot read data, which may cause wait of the thread. Therefore, in the prior art, different domain name cache information affects each other. Updating information of one domain name may cause other domain name information unable to be read. When a large number of update operations exist, a long time delay of a read operation may be caused if the prior art is used, thereby greatly reducing a response speed.

Additionally, in the prior art, cache update is not smart. In the prior art, it is determined whether to update a cache merely according to valid time, automatic cache management is unavailable to a domain name having many special requirements, and it is impossible to better improve a quality in granting a request In conclusion, in the prior art, when cache information is processed, there are problems of thread wait and a corresponding speed decreased due to mutual influence of different cache information and problems of not smart in updating cache information and low in quality of cache information due to absence of a preliminary update function or an update control strategy, and a case of too many updates may likely happen at the same time, thereby having a negative effect on users' normal visits.

SUMMARY

In view of the aforementioned problems, the disclosure is proposed to provide a method, a device and a corresponding system for processing DNS cache information for overcoming the aforementioned problems or at least in part solving or mitigating the aforementioned problems.

According to one aspect of the invention, there is provided A method for processing DNS cache information, including: resolving and obtaining domain name information of a client request when receiving the client request; querying in a database a data structure corresponding to the domain name information; acquiring read lock information corresponding to the data structure when querying the data structure out, wherein the read lock information is permission information allowing performing a read operation on cache information stored in the data structure; reading the cache information in the data structure by using a permission of the read lock information, and transmitting the read cache information to a sender of the client request.

According to another aspect of the invention, there is provided a device for processing DNS cache information, including: a receiver, configured to receive a client request; a resolver, configured to resolve and obtain domain name information of the client request; a querier, configured to query in a database a data structure corresponding to the domain name information; an acquirer, configured to acquire read lock information corresponding to the data structure when the querier queries the data structure out, wherein the read lock information is permission information allowing performing a read operation on cache information stored in the data structure; a reader, configured to read the cache information in the data structure by using a permission of the read lock information; and a transmitter, configured to transmit the read cache information to a sender of the client request.

According to still another aspect of the invention, there is provided A DNS domain name resolution system, including the device for processing DNS cache information above, a client and a domain name resolution device, wherein the client is configured to transmit a client request to the device for processing DNS cache information; the device for processing DNS cache information is configured to: resolve and obtain domain name information of the client request when receiving the client request; query in a database a data structure corresponding to the domain name information; acquire read lock information corresponding to the data structure when querying out the data structure, wherein the read lock information is permission information allowing performing a read operation on cache information stored in the data structure; read the cache information in the data structure by using a permission of the read lock information, and transmit the cache information to a sender of the client request; and the domain name resolution device is configured to resolve a domain name corresponding to the domain name information according to the cache information.

According to still still another aspect of the invention, there is provided a computer program, comprising a computer-readable code, wherein a computer device is caused to execute the method for processing DNS cache information above when the computer-readable code runs on the computer device.

According to yet still another aspect of the invention, there is provided computer-readable medium, storing the computer program above.

The disclosure has following beneficial effects:
in embodiments of the disclosure, when a client request is received, domain name information of the client request is resolved and obtained, and a data structure corresponding to the domain name information is queried in a database. In embodiments of the disclosure, read lock information corresponding to the data structure is acquired when the data structure is queried out, cache information in the data structure is read by using a permission of the read lock information, and the cache information is transmitted to a sender of the client request. According to the method for processing DNS cache information provided by the embodiments of the disclosure, cache information can be read by using read lock information one to one corresponding to the cache information. Reading the cache information does not affect operation of other cache information. Therefore, it is solved a problem that a mutual influence may be caused to operation of cache information corresponding to different domain name information and a corresponding speed may be reduced because lock information is overall set up for a data structure corresponding to all domain name information in the prior art, and operation of cache information can be performed more accurately and quickly.

Further, in the embodiments of the disclosure, write lock information corresponding to the cache information can be acquired, and a write operation is performed on the cache information according to the write lock information, which has no negative effect on operation performed on other cache information. In addition, in the embodiments of the disclosure, a strategy for updating cache information may also be set up to proactively update the cache information, thereby avoiding a problem that in the prior art cache information may be low in quality if the cache information is updated only according to a fact whether time is invalid. To sum up, by using embodiments of the disclosure, a corresponding speed and a cache information throughput can be improved, a flexibility of cache information can be improved, and a quality of stored information can be improved.

Described above is merely an overview of a technical solution of the disclosure. In order to more apparently understand the technical means of the disclosure to implement in accordance with the contents of specification, and to more readily understand above and other objectives, features and advantages of the disclosure, specific embodiments of the disclosure are provided hereinafter.

BRIEF DESCRIPTION OF THE DRAWINGS

Through reading the detailed description of the following preferred embodiments, various other advantages and benefits will become apparent to an ordinary person skilled in the art. Accompanying drawings are merely included for the purpose of illustrating the preferred embodiments and should not be considered as limiting of the disclosure. Further, throughout the drawings, same elements are indicated by same reference numbers.

DESCRIPTION OF THE EMBODIMENTS

A further description of the disclosure is made with reference to the accompanying drawings and specific embodiments hereinafter.

Figure 1:
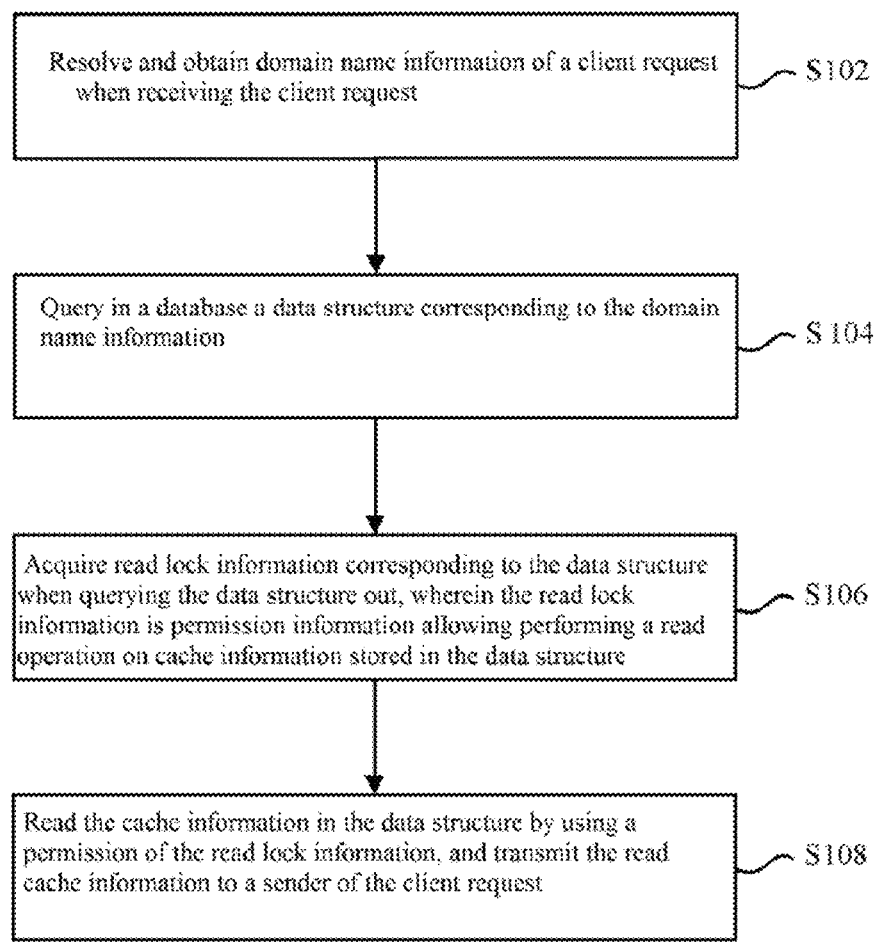
FIG. 1 illustrates a processing flow chart of a method for processing DNS cache information according to an embodiment of the disclosure.

To solve the foregoing technical problems, embodiments of the disclosure provide a method for processing DNS cache information. FIG. 1 illustrates a processing flow chart of a method for processing DNS cache information according to an embodiment of the disclosure. Referring to FIG. 1, the flow at least includes Steps S102-S108.

Step S102: resolve and obtain domain name information of a client request when receiving the client request.

Step S104: query in a database a data structure corresponding to the domain name information.

Step S106: acquire read lock information corresponding to the data structure when querying the data structure out, wherein the read lock information is permission information allowing performing a read operation on cache information stored in the data structure.

Step S108: read the cache information in the data structure by using a permission of the read lock information, and transmit the read cache information to a sender of the client request.

In embodiments of the disclosure, when a client request is received, domain name information of the client request is resolved and obtained, and a data structure corresponding to the domain name information is queried in a database. In embodiments of the disclosure, read lock information corresponding to the data structure is acquired when the data structure is queried out, cache information in the data structure is read by using a permission of the read lock information, and the cache information is transmitted to a sender of the client request. According to the method for processing DNS cache information provided by the embodiments of the disclosure, cache information can be read by using read lock information one to one corresponding to the cache information. Reading the cache information does not affect operation of other cache information. Therefore, it is solved a problem that a mutual influence may be caused to operation of cache information corresponding to different domain name information and a corresponding speed may be reduced because lock information is overall set up for data structure corresponding to all domain name information in the prior art, and operation of cache information can be performed more accurately and quickly.

Further, in the embodiments of the disclosure, write lock information corresponding to the cache information can be acquired, and a write operation is performed on the cache information according to the write lock information, which has no negative effect on operation performed on other cache information. In addition, in the embodiments of the disclosure, a strategy for updating cache information may also be set up to proactively update the cache information, thereby avoiding a problem that in the prior art cache information may be low in quality if the cache information is updated only according to a fact that whether time is invalid. To sum up, by using embodiments of the disclosure, a corresponding speed and a cache information throughput can be improved, a flexibility of cache information can be improved, and a quality of stored information can be improved.

As mentioned above, in the embodiments of the disclosure, domain name information of a client request can be obtained by resolving the received client request, and a data structure corresponding to the domain name information is queried in a database according to the domain name information. Preferably, in the embodiments of the disclosure, a hash value of the domain name information can be obtained by performing a hash value operation on the domain name information. A data structure corresponding to the domain name information is queried in a hash table according to the hash value of the domain name information. The hash table is a list of a data structure that can be directly accessed according to a key code value. Namely, records are accessed by mapping a key code value to a location in the hash table. Therefore, a lookup speed can be accelerated by using the hash table. In addition, a mapping function that maps a key code value to a location in the hash table for accessing may be referred to as a hashing function, therefore, the hash table may be also referred to as a hashing table.

Cache information is stored in the data structure through a hash operation. After acquiring a client request, in the embodiments of the disclosure, likewise a hash operation is performed on domain name information of the client request, and then the corresponding data structure is queried according to an acquired hash value. If the corresponding data structure is searched out, namely cache information stored in the data structure is present, read lock information is acquired, and the cache information is read by using the permission of the acquired read lock information. After reading the cache information, the cache information can be transmitted to a sender of the client request. If the corresponding data structure cannot be searched out, in the embodiments of the disclosure, the data structure is queried in a server according to domain name information. After acquiring a query result, the query result is transmitted to the sender of the client request and is written into a database.

When writing the query result queried out from the server into the database, in the embodiments of the disclosure, a corresponding data structure is set up in the database according to domain name information corresponding to the query result, and the data structure is initialized according to the domain name information. When initializing the set data structure, first of all, the domain name information is classified. For example, the domain name information is classified according to a fact whether the domain name information belongs to maliciously attacked domain name information; the domain name information is classified according to a fact whether the domain name information contains special information; and/or the domain name information is classified according to a fact whether the domain name information has special requirements. The domain name information may be classified by setting packet information conforming to an attack characteristic as special information in the domain name information. Then, lock information is set up for the data structure according to classification of the domain name information. In the embodiments of the disclosure, the lock information set up for the data structure may include read lock information, write lock information or permission information for performing an operation on the query result, which is not limited in the embodiments of the disclosure.

After initializing the data structure according to the above, the query result acquired from a server is written into the data structure, and the query result is converted into cache information cached in the data structure. When other client requests specific to the cache information are received, the cache information can be directly read and transmitted to the sender of the client request after acquiring the read lock information. Furthermore, in the embodiments of the disclosure, a default rule for updating the cache information may be set up according to classification of the domain name information. In the embodiments of the disclosure, the default rule for updating the cache information may be set up according to domain name information that is maliciously attacked domain name information, specifically, for example, the cache information is updated every five minutes, and the cache information is updated after receiving a client request specific to the cache information for three times. For another example, in the embodiments of the disclosure, domain name information also may be classified according to an importance level of the domain name information and/or statistics of visits to the domain name information. For example, after visits to domain name information are counted and sorted, domain name information whose visits are top 100 is acquired as domain name information of the same category, and a default rule for updating the domain name information of this category is set up as below: cache information corresponding to the domain name information of this category is updated within the first five seconds before a time to live (TTL) expires. The TTL denotes cache time recorded on the database.

Read lock information is acquired and cache information is read according to the read lock information after receiving a client request, resolving the acquired domain name information and further querying a corresponding data structure out. It is determined whether to update the cache information according to the default rule for updating the cache information after reading the cache information. For example, in an example as mentioned above, when domain name information corresponding to the cache information is maliciously attacked domain name information (for example, it is determined whether domain name information is maliciously attacked domain name information according to a request type or request additional information in the domain name information), after the cache information is transmitted to the sender of the client request, if it is determined that the TTL of the cache information has exceeded five minutes according to the default rule for updating the cache information, a query result corresponding to the domain name information is acquired from the server, and the query result is updated into a corresponding to data structure and used as updated cache information. Write lock information corresponding to the data structure is acquired before updating the cache information. Then the updated cache information is written into the data structure by using the permission of the write lock information. When the client request is received again, the updated cache information is transmitted to the sender of the client request. After the cache information is transmitted to the sender of the client, the cache information remains unchanged if it is unnecessary to update the cache information according to the default rule for updating the cache information.

As mentioned above, in the embodiments of the disclosure, the query result acquired from the server is stored in a data structure of a database (for example, a hash table) through a hash operation. When receiving a client request, domain name information is obtained according to resolution of the client request, then a hash operation is performed on the domain name information to obtain a hash value of the domain name information, and further a corresponding data structure is searched out from the database. Cache information can be acquired from the data structure and transmitted to the sender of the client request. The data structure is queried from the server if it is not searched out. After acquiring a query result, the query result is transmitted to the sender of the client request and is written into the database. Therefore, when receiving a next client request, the cache information can be timely transmitted to the sender of the client request, thereby achieving a beneficial effect of quick response.

In practical application, the database storing cache information generally runs on a multicore server. The multicore server refers to a processor into which two or more complete computer engines (namely kernels) are integrated. In the database of the multicore server, various multithreaded operations can be allowed to be carried out simultaneously, a plurality of read operations or write operations may be performed on different data structures in the database at the same time. To ensure a correctness of a read operation and/or a write operation, a lock is set up for a data structure to ensure that operation of cache information in the data structure can be only performed by a thread that obtains the lock, wherein lock setup of the data structure is permission information for performing an operation on the cache information in the data structure.

In the prior art, acquiring read lock information of one data structure in a database and then reading cache information in the data structure have no negative effect on operation of cache information in other data structures. However, acquiring write lock information of one data structure in a database and then performing a write operation on cache information in the data structure will delay operation of cache information in other data structures. Therefore, in the prior art, a system performance can be improved only by improving read lock usage and reducing write lock usage. In the embodiments of the disclosure, corresponding write lock information and read lock information are set up for each data structure. In this way, it can be guaranteed that operation of a single data structure cannot have a negative effect on any other data structures, thereby improving a system performance, an operation efficiency and a user experience.

Based on the method for processing DNS cache information provided by above preferred embodiments and on the same inventive concept, embodiments of the disclosure provide a device for processing DNS cache information to implement the method for processing DNS cache information.

Figure 2:
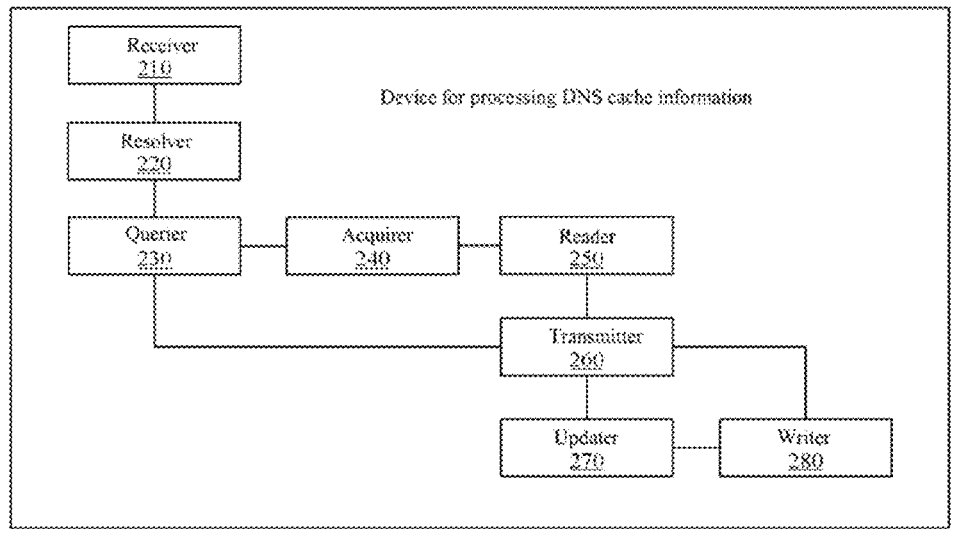
FIG. 2 illustrates a schematic structural diagram of a device for processing DNS cache information according to an embodiment of the disclosure.

FIG. 2 illustrates a schematic structural diagram of a device for processing DNS cache information according to an embodiment of the disclosure. Referring to FIG. 2, the device for processing DNS cache information according to this embodiment of the disclosure at least includes: a receiver 210, a resolver 220, a querier 230, an acquirer 240, a reader 250 and a transmitter 260.

Functions of various devices or compositions and a relationship of connection between parts of the device for processing DNS cache information according to this embodiment of the disclosure are introduced as below.

The receiver 210 is configured to receive a client request.

The resolver 220 is connected to the receiver 210 and is configured to resolve and obtain domain name information of the client request.

The querier 230 is connected to the resolver 220 and is configured to query in a database a data structure corresponding to the domain name information.

The acquirer 240 is connected to the querier 230 and is configured to acquire read lock information corresponding to the data structure when the querier 230 queries the data structure out, wherein the read lock information is permission information allowing performing a read operation on cache information stored in the data structure.

The reader 250 is connected to the acquirer 240 and is configured to read the cache information in the data structure by using a permission of the read lock information.

The transmitter 260 is connected to the reader 250 and is configured to transmit the read cache information to a sender of the client request.

In a preferred embodiment, wherein
  the resolver 220 is further configured to perform a hash value operation on the domain name information to obtain a hash value of the domain name information; and
  the querier 230 is further configured to query in a hash table a data structure corresponding to the domain name information according to the hash value of the domain name information.

Figure 3:
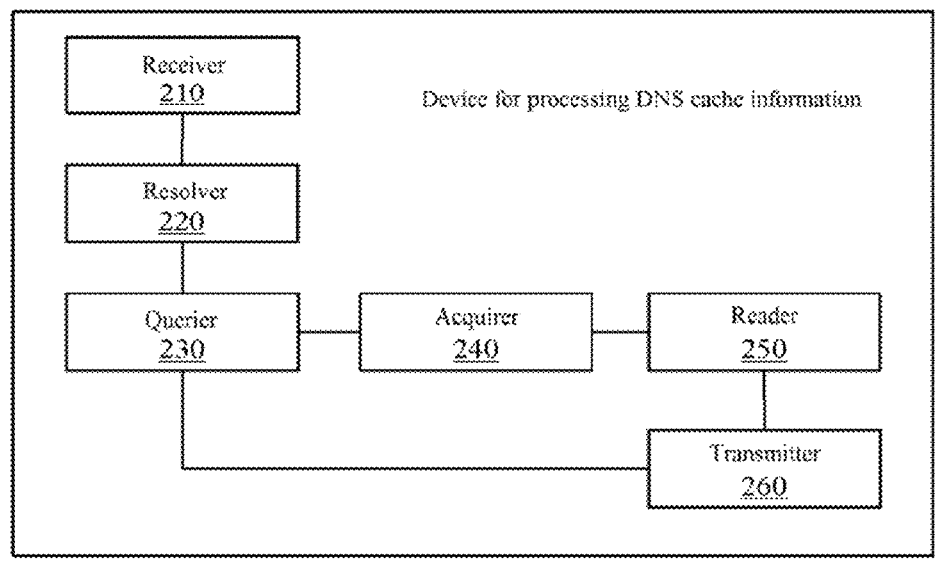
FIG. 3 illustrates a schematic structural diagram of a device for processing DNS cache information according to a preferred embodiment of the disclosure.

FIG. 3 illustrates a schematic structural diagram of a device for processing DNS cache information according to a preferred embodiment of the disclosure. Referring to FIG. 3, in a preferred embodiment,
  the querier 230 is further configured to query in a server according to the domain name information and acquire a query result if no data structure corresponding to the domain name information is present in the database;
  the transmitter 260 is connected to the querier 230 and is further configured to transmit the query result to the sender of the client request; and
  the device further includes a writer 280, connected to the transmitter 260 and configured to write the query result into the database.

In a preferred embodiment, the writer 280 is configured to write the query result into the database according to following steps:
  setting up in the database a data structure corresponding to the domain name information;
  initializing the data structure according to the domain name information; and
  writing the query result into the data structure to convert the query result into cache information stored in the data structure.

In a preferred embodiment, the writer 280 is further configured to:
  classify the domain name information; and
  set up lock information of the data structure according to a classification result, wherein the lock information is permission information for performing a corresponding operation on the cache information, including the read lock information and/or write lock information.

In a preferred embodiment, the writer 280 is further configured to:
  set up a default rule for updating the cache information according to the classification result.

As shown in FIG. 3, in a preferred embodiment, the device further includes:
  an updater 270, respectively connected to the transmitter 260 and the writer 280 and configured to: determine whether to update the cache information according to the default rule for updating the cache information after the transmitter 260 transmits the cache information to the sender of the client request;
  acquire the updated cache information from the server and trigger the writer 280 to write the updated cache information into the database if yes; otherwise remain the cache information unchanged if no.

In a preferred embodiment, the writer 280 is further configured to write the updated cache information into the database according to following steps:

triggering an operation for acquiring write lock information of the data structure storing the cache information; and writing the updated cache information into the database when acquiring the write lock information.

Figure 4:
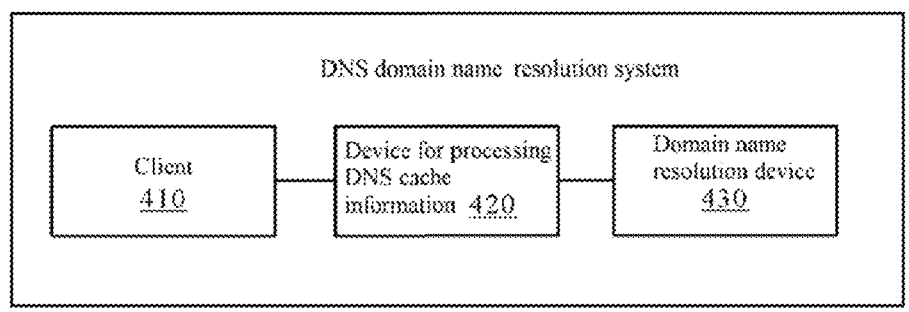
FIG. 4 illustrates a schematic structural diagram of a DNS domain name resolution system according to an embodiment of the disclosure.

Based on the method and device for processing DNS cache information provided by above preferred embodiments and on the same inventive concept, embodiments of the disclosure provide a DNS domain name resolution system. FIG. 4 illustrates a schematic structural diagram of a DNS domain name resolution system according to an embodiment of the disclosure. Referring to FIG. 4, the DNS domain name resolution system provided by this embodiment of the disclosure at least includes: a client 410, a device for processing DNS cache information 420 and a domain name resolution device 430. It is to be noted that FIG. 4 merely illustrates one client 410, in a practical operation, the number of clients 410 may be an arbitrary integer, which is not limited by the embodiments of the disclosure.

Functions of various compositions and a relationship of connection between parts of the DNS domain name resolution system according to this embodiment of the disclosure are introduced as below:

the client 410 is configured to transmit a client request to the device for processing DNS cache information 420.

The device for processing DNS cache information 420 is coupled to the client 410 and is configured to: resolve and obtain domain name information of a client request when receiving the client request; query in a database a data structure corresponding to the domain name information; acquire read lock information corresponding to the data structure when querying out the data structure, wherein the read lock information is permission information allowing performing a read operation on cache information stored in the data structure; read the cache information in the data structure by using a permission of the read lock information, and transmit the read cache information to a sender of the client request.

The domain name resolution device 430 is coupled to the device for processing DNS cache information 420 and is configured to resolve a domain name corresponding to the domain name information according to the cache information.

Figure 5:
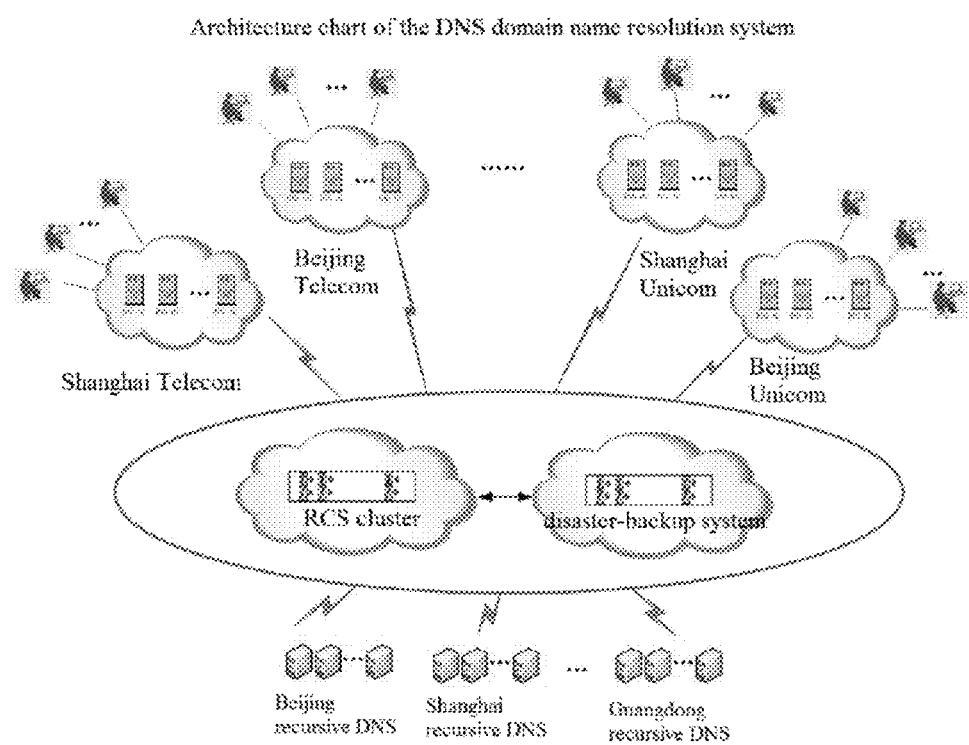
FIG. 5 illustrates an architecture chart of a DNS domain name resolution system according to a preferred embodiment of the disclosure.

FIG. 5 illustrates an architecture chart of a DNS domain name resolution system according to a preferred embodiment of the disclosure. Referring to FIG. 5, Shanghai Telecom, Beijing Telecom, Shanghai Unicom and Beijing Unicom users send client requests. A DNS domain name resolution system of Shanghai Telecom users is positioned in a Shanghai Telecom server cluster (a cloud-shaped icon of Shanghai Telecom in FIG. 5), devices for processing DNS cache information in the system can perform read operations and/or write operations on cache information by using read-write locks. Operation of single cache information does not have a negative effect on operation of other cache information, thereby avoiding mutual influence of operation of cache information corresponding to different domain name information. Therefore, the devices for processing DNS cache information in the system can improve a corresponding speed of client requests and can more accurately and quickly perform operation on cache information. In addition, a strategy for updating cache information can be set up for the devices for processing DNS cache information in the system to proactively update the cache information, thereby avoiding a problem that the cache information is low in quality.

Similarly, a DNS domain name resolution system of Beijing Telecom users is positioned in a Beijing Telecom server cluster (a cloud-shaped icon of Beijing Telecom in FIG. 5), devices for processing DNS cache information in the system can perform the foregoing operations. Similarly, a DNS domain name resolution system of Shanghai Unicom users is positioned in a Shanghai Unicom server cluster (a cloud-shaped icon of Shanghai Unicom in FIG. 5), devices for processing DNS cache information in the system can perform the foregoing operations. Similarly, a DNS domain name resolution system of Beijing Unicom users is positioned in a Beijing Unicom server cluster (a cloud-shaped icon of Beijing Unicom in FIG. 5), devices for processing DNS cache information in the system can perform the foregoing operations.

The device for processing DNS cache information in the system of embodiments of the disclosure can query corresponding cache information out according to a client request and transmit the cache information to a corresponding sender of the client request. After the transmission, the device can timely update the cache information according to a default rule. Therefore, the device for processing DNS cache information in the domain name system as shown in FIG. 5 can reduce a resolution delay by adopting means of cache access optimization and/or preliminary update, and then can improve a resolution efficiency and optimize a system performance.

Referring to FIG. 5, the other side of each DNS domain name resolution system is connected to an RCS cluster and a disaster recovery system, and then is connected to a recursive DNS through the RCS cluster and the disaster recovery system. According to regional division, the recursive DNS may be a Beijing recursive DNS, a Shanghai recursive DNS, a Guangdong recursive DNS or the like.

According to any one preferred embodiment or combination of more preferred embodiments above, embodiments of the disclosure can achieve the following beneficial effects.

In embodiments of the disclosure, when a client request is received, domain name information of the client request is resolved and obtained, and a data structure corresponding to the domain name information is queried in a database. In embodiments of the disclosure, read lock information corresponding to the data structure is acquired when the data structure is queried out, cache information in the data structure is read by using a permission of the read lock information, and the cache information is transmitted to a sender of the client request. According to the method for processing DNS cache information provided by the embodiments of the disclosure, cache information can be read by using read lock information one to one corresponding to the cache information. Reading the cache information does not affect operation of other cache information. Therefore, it is solved a problem that a mutual influence may be caused to operation of cache information corresponding to different domain name information and a corresponding speed may be reduced because lock information is overall set up for data structure corresponding to all domain name information in the prior art, and operation of cache information can be performed more accurately and quickly.

Further, in the embodiments of the disclosure, write lock information corresponding to the cache information can be acquired, and a write operation is performed on the cache information according to the write lock information, which has no negative effect on operation performed on other cache information. In addition, in the embodiments of the disclosure, a strategy for updating cache information may also be set up to proactively update the cache information, thereby avoiding a problem that in the prior art cache information may be low in quality if the cache information is updated only according to a fact that whether time is invalid. To sum up, by using embodiments of the disclosure, a corresponding speed and a cache information throughput can be improved, a flexibility of cache information can be improved, and a quality of stored information can be improved.

Many details are discussed in the specification provided herein. However, it should be understood that the embodiments of the disclosure can be implemented without these specific details. In some examples, the well-known methods, structures and technologies are not shown in detail so as to avoid an unclear understanding of the description.

Similarly, it should be understood that, in order to simplify the disclosure and to facilitate the understanding of one or more of various aspects thereof, in the above description of the exemplary embodiments of the disclosure, various features of the disclosure may sometimes be grouped together into a single embodiment, accompanying figure or description thereof. However, the method of this disclosure should not be constructed as follows: the disclosure for which the protection is sought claims more features than those explicitly disclosed in each of claims. More specifically, as reflected in the following claims, the inventive aspect is in that the features therein are less than all features of a single embodiment as disclosed above. Therefore, claims following specific embodiments are definitely incorporated into the specific embodiments, wherein each of claims can be considered as a separate embodiment of the disclosure.

It should be understood by those skilled in the art that modules of the device in the embodiments can be adaptively modified and arranged in one or more devices different from the embodiment. Modules, units or components in the embodiment can be combined into one module, unit or component, and also can be divided into more sub-modules, sub-units or sub-components. Except that at least some of features and/or processes or units are mutually exclusive, various combinations can be used to combine all the features disclosed in specification (including claims, abstract and accompanying figures) and all the processes or units of any methods or devices as disclosed herein. Unless otherwise definitely stated, each of features disclosed in specification (including claims, abstract and accompanying figures) may be taken place with an alternative feature having same, equivalent or similar purpose.

In addition, it should be understood by those skilled in the art, although some embodiments as discussed herein comprise some features included in other embodiment rather than other feature, combination of features in different embodiment means that the combination is within a scope of the disclosure and forms the different embodiment. For example, in the claims, any one of the embodiments for which the protection is sought can be used in any combination manner.

Each of devices according to the embodiments of the disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the modules in the device according to the embodiments of the disclosure. The disclosure may further be implemented as device program (for example, computer program and computer program product) for executing some or all of the methods as described herein. Such program for implementing the disclosure may be stored in the computer readable medium, or have a form of one or more signals. Such a signal may be downloaded from the internet websites, or be provided in carrier, or be provided in other manners.

Figure 6:
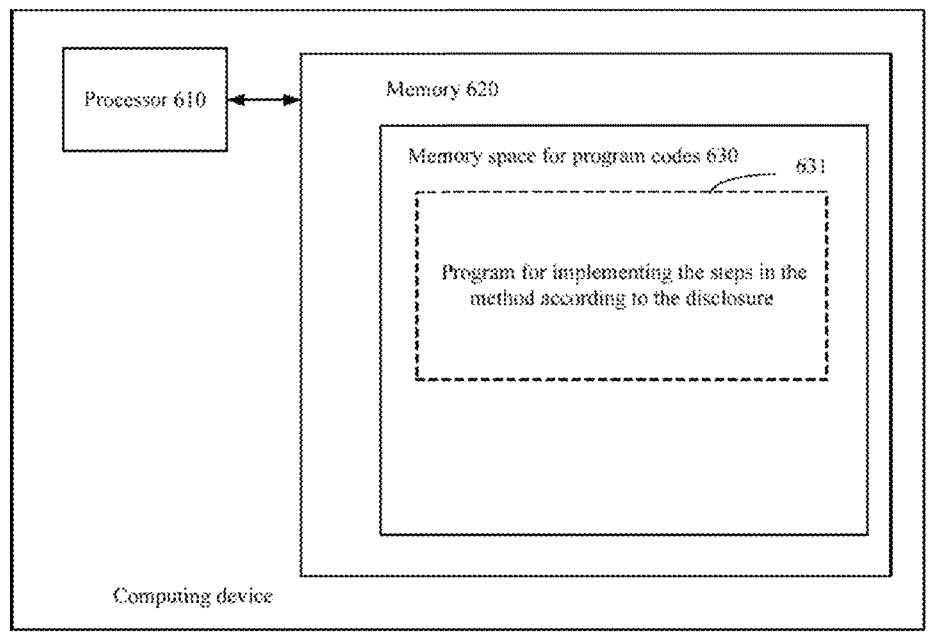
FIG. 6 schematically illustrates a block diagram of a computer device configured to execute the method for processing DNS cache information according to the disclosure.
Figure 7:
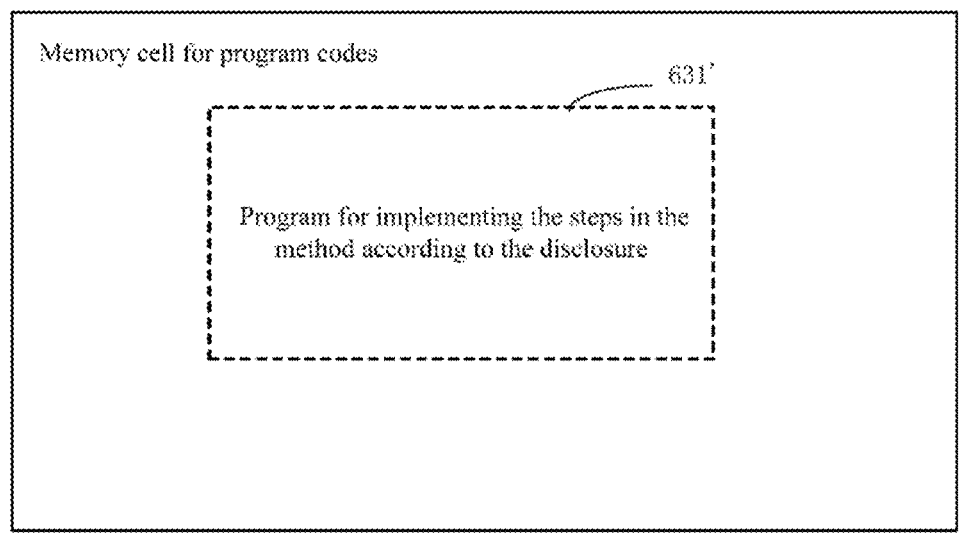
FIG. 7 schematically illustrates a storage unit configured to maintain or carry a program code for implementing the method for processing DNS cache information according to the disclosure.

For example, FIG. 6 illustrates a block diagram of a computing device for executing the method according the disclosure. Traditionally, the computing device includes a processor 610 and a computer program product or a computer readable medium in form of a memory 620. The memory 620 could be electronic memories such as flash memory, EEPROM (Electrically Erasable Programmable Read-Only Memory), EPROM, hard disk or ROM. The memory 620 has a memory space 630 for executing program codes 631 of any steps in the above methods. For example, the memory space 630 for program codes may include respective program codes 631 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 7. The memory cells may be provided with memory sections, memory spaces, etc., similar to the memory 620 of the computing device as shown in FIG. 6. The program codes may be compressed for example in an appropriate form. Usually, the memory cell includes computer readable codes 631' which can be read for example by processors 610. When these codes are operated on the computing device, the computing device may execute respective steps in the method as described above.

The "an embodiment", "embodiments" or "one or more embodiments" mentioned in the disclosure means that the specific features, structures or performances described in combination with the embodiment(s) would be included in at least one embodiment of the disclosure. Moreover, it should be noted that, the wording "in an embodiment" herein may not necessarily refer to the same embodiment.

It should be noted that the above-described embodiments are intended to illustrate but not to limit the disclosure, and alternative embodiments can be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

Also, it should be noticed that the language used in the present specification is chosen for the purpose of readability and teaching, rather than explaining or defining the subject matter of the disclosure. Therefore, it is obvious for an ordinary skilled person in the art that modifications and variations could be made without departing from the scope and spirit of the claims as appended. For the scope of the disclosure, the publication of the inventive disclosure is illustrative rather than restrictive, and the scope of the disclosure is defined by the appended claims.

What is claimed is:

1. A method for processing Domain Name System (DNS) cache information, comprising:
   obtaining domain name information from a first client request;
   querying a server according to the domain name information and acquiring a query result;
   generating a corresponding data structure in a database and converting the query result to cache information stored in the corresponding data structure, wherein the generating the corresponding data structure further comprises:
      classifying the domain name information based on one or more predetermined rules, and
      determining and setting lock information of the corresponding data structure based on a classification result, wherein the lock information is associated with at least one permission for performing a corresponding operation on the cache information, and the lock information comprises at least one of read lock information and write lock information;
   querying the corresponding data structure in the database in response to receiving a second client request, the second client request including the domain name information;
   acquiring the cache information from the corresponding data structure; and
   transmitting the cache information to a sender of the second client request.

2. The method according to claim 1, wherein the querying the corresponding data structure further comprises:
   performing a hash value operation on the domain name information to obtain a hash value of the domain name information; and
   querying, in a hash table, the corresponding data structure according to the hash value of the domain name information.

3. The method according to claim 1, further comprising:
   transmitting the query result to a sender of the first client request.

4. The method according to claim 1, further comprising:
   determining a default rule for updating the cache information according to the classification result, wherein the default rule comprises updating the cache information according to at least one of a level of the domain name information and statistics of visits to the domain name information.

5. The method according to claim 4, wherein after the transmitting the cache information to a sender of the second client request, the method further comprises:
   determining whether to update the cache information according to the default rule for updating the cache information;
   if yes, acquiring updated information from the server and writing the updated information into the corresponding data structure in the database;
   if no, remaining the cache information unchanged.

6. The method according to claim 5, wherein the writing the updated information into the corresponding data structure in the database comprises:
   triggering an operation for acquiring the write lock information of the corresponding data structure storing the cache information; and
   writing the updated information into the corresponding data structure in the database when acquiring the write lock information of the corresponding data structure.

7. The method of claim 1, wherein the database comprises a plurality of data structures, each of the plurality of data structures storing corresponding cache information and having corresponding lock information.

8. The method of claim 1, wherein the acquiring the cache information from the corresponding data structure further comprises:
   obtaining the read lock information of the corresponding data structure; and
   reading the cache information in the corresponding data structure by using a permission associated with the read lock information, the permission allowing to perform a read operation on the cache information stored in the corresponding data structure.

9. A computing device, comprising:
   a memory having instructions stored thereon;
   a processor configured to execute the instructions to perform operations for processing Domain Name System (DNS) cache information, the operations comprising:
   receiving a first client request;
   obtaining domain name information from the first client request;
   querying a server according to the domain name information and acquiring a query result;
   generating a corresponding data structure in a database and converting the query result to cache information stored in the corresponding data structure, wherein the generating the corresponding data structure further comprises:
      classifying the domain name information based on one or more predetermined rules, and
      determining and setting lock information of the corresponding data structure based on a classification result, wherein the lock information is associated with at least one permission for performing a corresponding operation on the cache information, and the lock information comprises at least one of read lock information and write lock information;
   querying the corresponding data structure in the database in response to receiving a second client request, the second client request including the domain name information;
   acquiring the cache information from the corresponding data structure; and
   transmitting the cache information to a sender of the second client request.

10. The computing device according to claim 9, wherein the querying the corresponding data structure further comprises:
    performing a hash value operation on the domain name information to obtain a hash value of the domain name information; and
    querying, in a hash table, the corresponding data structure according to the hash value of the domain name information.

11. The computing device according to claim 9, wherein the operations further comprising:
    transmitting the query result to a sender of the first client request.

12. The computing device according to claim 9, wherein the operations further comprises:
    determining a default rule for updating the cache information according to the classification result, wherein the default rule comprises updating the cache information according to at least one of a level of the domain name information and statistics of visits to the domain name information.

13. The computing device according to claim 12, wherein the processor is further configured to perform:
    determining whether to update the cache information according to the default rule for updating the cache information after the transmitter transmits the cache information to the sender of the client request;
    if yes, acquiring updated information from the server and writing the updated information into the corresponding data structure in the database;
    if no, remaining the cache information unchanged.

14. The computing device according to claim 13, wherein the writing the updated information into the corresponding data structure in the database comprises:
    triggering an operation for acquiring the write lock information of the data structure storing the cache information; and
    writing the updated information into the corresponding data structure in the database when acquiring the write lock information of the corresponding data structure.

15. The computing device of claim 9, wherein the database comprises a plurality of data structures, each of the plurality of data structures storing corresponding cache information and having corresponding lock information.

16. The computing device of claim 9, wherein the acquiring the cache information from the corresponding data structure further comprises:
    obtaining the read lock information of the corresponding data structure; and
    reading the cache information in the corresponding data structure by using a permission associated with the read lock information, the permission allowing to perform a read operation on the cache information stored in the corresponding data structure.

17. A non-transitory computer-readable medium, having computer programs stored thereon that, when executed by one or more processors of a computing device, cause the computing device to perform:
    obtaining domain name information from a first client request;
    querying a server according to the domain name information and acquiring a query result;
    generating a corresponding data structure in a database and converting the query result to cache information stored in the corresponding data structure, wherein the generating the corresponding data structure further comprises:
        classifying the domain name information based on one or more predetermined rules, and
        determining and setting lock information of the corresponding data structure based on a classification result, wherein the lock information is associated with at least one permission for performing a corresponding operation on the cache information, and the lock information comprises at least one of read lock information and write lock information;
    querying the corresponding data structure in the database in response to receiving a second client request, the second client request including the domain name information;
    acquiring the cache information from the corresponding data structure; and
    transmitting the cache information to a sender of the second client request.

18. The non-transitory computer-readable medium according to claim 17, wherein the querying the corresponding data structure further comprises:
    performing a hash value operation on the domain name information to obtain a hash value of the domain name information; and
    querying, in a hash table, the corresponding data structure according to the hash value of the domain name information.

19. The non-transitory computer-readable medium according to claim 17, wherein after the querying in a database a data structure corresponding to the domain name information, the computing device is further caused to perform:
    transmitting the query result to a sender of the first client request.

20. The non-transitory computer-readable medium of claim 17, wherein the database comprises a plurality of data structures, each of the plurality of data structures storing corresponding cache information and having corresponding lock information.

* * * * *